United States Patent
Kumano et al.

[11] Patent Number: 5,942,705
[45] Date of Patent: Aug. 24, 1999

[54] LEAF SPRING AND MOUNTING CONSTRUCTION OF THE SAME

[75] Inventors: Shinji Kumano; Tsuyoshi Sato, both of Hamamatsu, Japan

[73] Assignee: Yamaha Corporation, Japan

[21] Appl. No.: 08/814,727

[22] Filed: Mar. 7, 1997

[30] Foreign Application Priority Data

Mar. 7, 1996 [JP] Japan .................................. 8-050575

[51] Int. Cl.⁶ .................................................. G10D 13/08
[52] U.S. Cl. ............................ 84/402; 84/433; 84/423 R
[58] Field of Search ................................ 84/423 R, 433, 84/402

[56] References Cited

U.S. PATENT DOCUMENTS

| | | | |
|---|---|---|---|
| 3,879,051 | 4/1975 | Kolbe | 280/86.751 |
| 3,919,910 | 11/1975 | Rust . | |
| 4,901,614 | 2/1990 | Kumano et al. | 84/719 |

FOREIGN PATENT DOCUMENTS

| | | |
|---|---|---|
| 57-89040 | 6/1982 | Japan . |
| 57-110836 | 7/1982 | Japan . |
| 60-142330 | 9/1985 | Japan . |

OTHER PUBLICATIONS

Henry F. Olson, Musical Engineering, 1952 p. 74.

*Primary Examiner*—William M. Shoop, Jr.
*Assistant Examiner*—Shih-yung Hsieh
*Attorney, Agent, or Firm*—Rossi & Associates

[57] ABSTRACT

A mounting construction of an elongated leaf spring deformed in an S-letter configuration and engaged at opposite ends thereof with a pair of spaced support members in a compressed condition to effect outward biasing forces acting of the support members, wherein three nodes are formed at the opposite ends and an intermediate position of the leaf spring in a longitudinal direction to form a pair of antinodes between the opposite ends and intermediate position of the leaf spring.

9 Claims, 8 Drawing Sheets

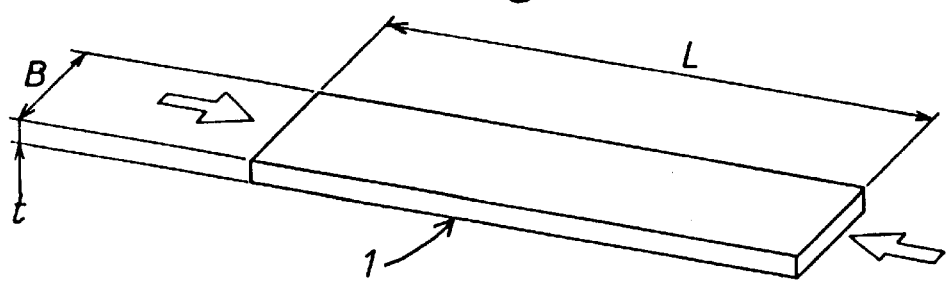
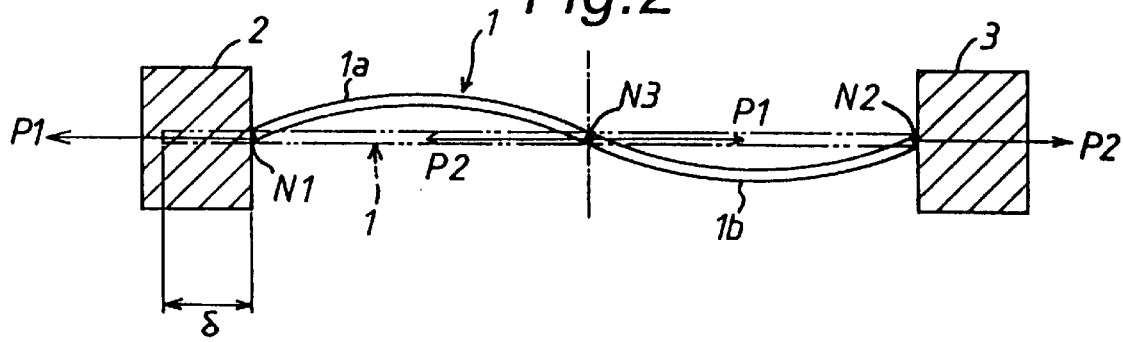
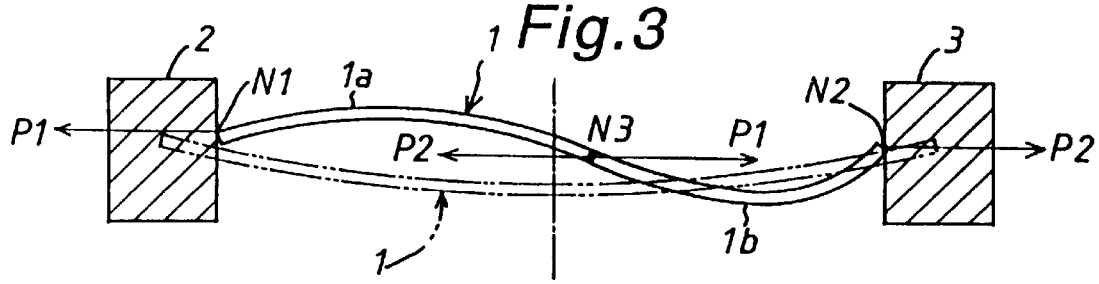
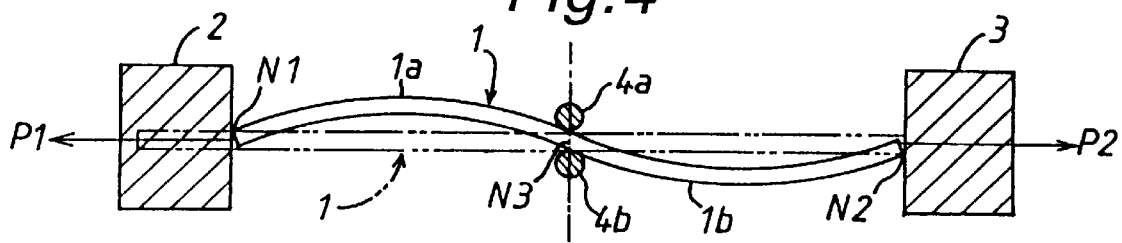

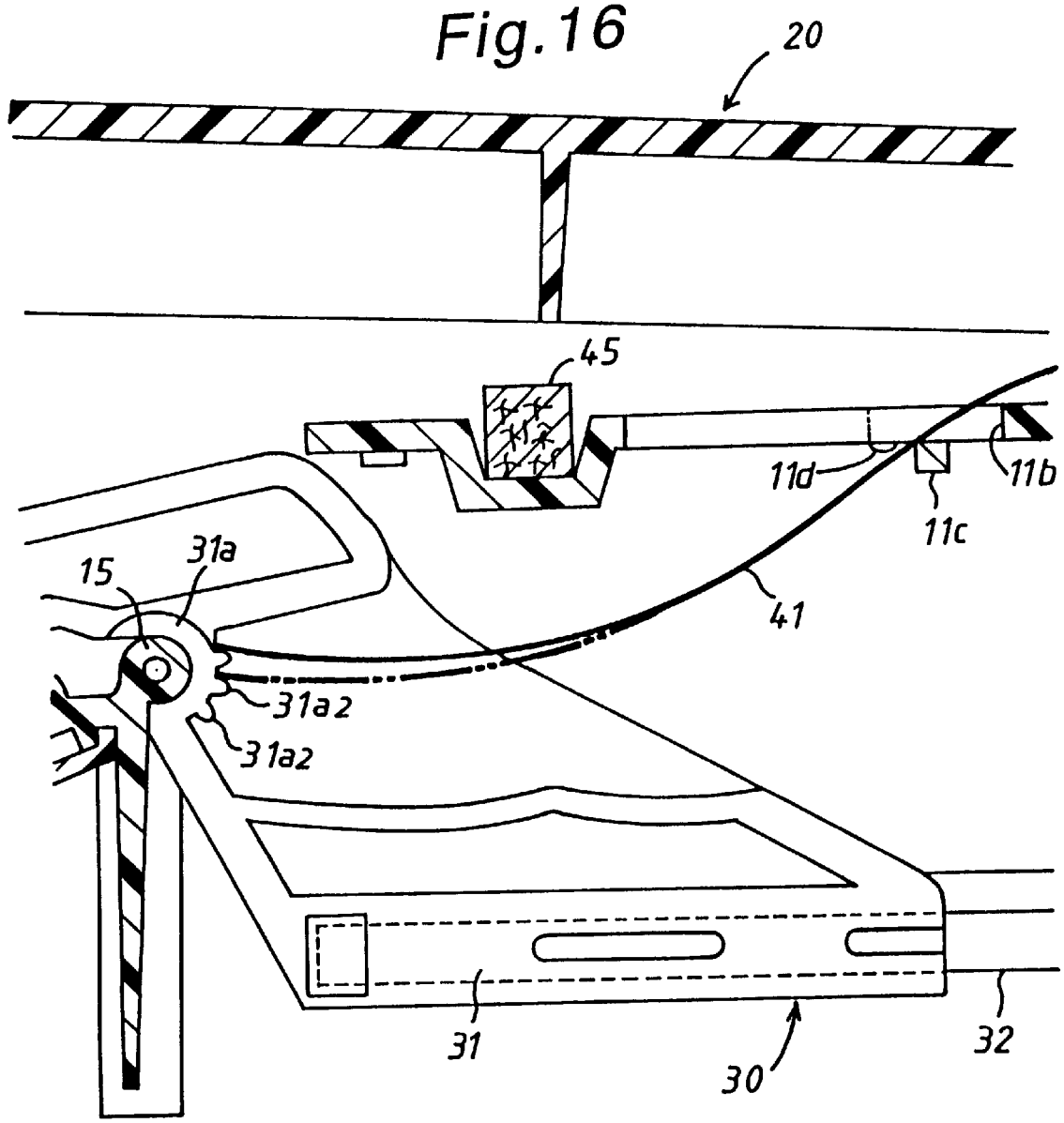

LEAF SPRING AND MOUNTING CONSTRUCTION OF THE SAME

BACKGROUND OF THE INVENTION

1. Field of the Invention

The present invention relates to a leaf spring engaged with a pair of spaced support members at opposite ends thereof in a compressed condition to effect outward biasing forces in a longitudinal direction thereof and a mounting construction of the leaf spring, for example, in a keyboard apparatus of a musical instrument.

2. Description of the Prior Art

Illustrated in FIG. 7 is a conventional leaf spring 1 which is engaged with a pair of spaced support members 2 and 3 at opposite ends thereof in a compressed condition to effect outward biasing forces in a longitudinal direction thereof. In this mounting construction, the leaf spring is deformed in a C-letter configuration so that the opposite ends of the leaf spring are formed as nodes N1 and N2 while an intermediate portion of the leaf spring is formed as an antinode. In U.S. Pat. No. 4,901,614 issued on Feb. 20, 1990, there is disclosed a leaf spring of this kind assembled within a keyboard apparatus to bias a key and swing lever toward a frame structure.

In the case that a rolled steel plate is used to provide the leaf spring 1 by press forming, the leaf spring 1 warps in a free condition. If the leaf spring in the free condition warps in a pressed direction, the outward biasing forces P1 and P2 acting on the support members are decreased in accordance with the warp of the leaf spring. If the leaf spring in the free condition warps in the opposite direction, the outward biasing forces P1 and P2 acting on the support members 2 and 3 are increased in accordance with the warp of the leaf spring.

SUMMARY OF THE INVENTION

It is, therefore, a primary object of the present invention to provide a leaf spring and a mounting construction of the same capable of effecting outward biasing forces in a longitudinal direction without any influence caused by warp of the leaf spring in a free condition.

Another object of the present invention is to provide a keyboard apparatus the keys of which are uniformly biased by leaf springs assembled therewith without any influence caused by each warp of the leaf springs in a free condition thereof.

According to the present invention, there is provided an elongated leaf spring deformed in an S-letter configuration to be engaged with a pair of spaced support members at opposite ends thereof in a compressed condition in such a manner that three nodes are formed at the opposite ends and an intermediate position of the leaf spring in a longitudinal direction to form a pair of antinodes between the opposite ends and intermediate position of the leaf spring.

According to an aspect of the present invention. there is provided a mounting construction of a leaf spring deformed in an S-letter configuration and engaged with a pair of spaced support members at opposite ends thereof in a compressed condition to effect outward biasing forces acting on the support members, wherein three nodes are formed at the opposite ends and an intermediate position of the leaf spring in a longitudinal direction to form a pair of antipodes between the opposite ends and intermediate position of the leaf spring. In the mounting construction of the leaf spring, it is preferable that the leaf spring is carried by a pair of restriction members at its intermediate position to restrict vertical displacement of the leaf spring to form one of the three nodes at the intermediate position of the leaf spring.

According to another aspect of the present invention. there is provided a keyboard apparatus which comprises a frame structure, a key pivoted on a rear end portion of the frame structure at a proximal end thereof to be movable in a vertical direction, a swing lever pivoted on a support portion of the frame structure spaced forward from the pivoted position of the key to be movable in a vertical direction, the swing lever being engaged with a front portion of the key to apply a reaction force to the key when the key is depressed, wherein an elongated leaf spring deformed in an S-letter configuration is engaged at opposite ends thereof with the pivoted portion of the swing lever and the proximal end or the key in a compressed condition in such a manner that three nodes are formed at the opposite ends and an intermediate position of the leaf spring in a longitudinal direction to form a pair of antinodes between the opposite ends and intermediate position of the leaf spring.

BRIEF DESCRIPTION OF THE DRAWINGS

Other objects features and advantages of the present invention will be more readily appreciated from the following detailed description of preferred embodiments thereof when taken together with the accompanying drawings, in which:

FIG. 1 is a perspective view of an elongated leaf spring in a free condition;

FIG. 2 illustrates an elongated leaf spring deformed in an S-letter configuration and engaged with a pair of spaced support members at opposite ends thereof in a compressed condition;

FIG. 3 illustrates an elongated leaf spring warped in a free condition and engaged with a pair of spaced support members at opposite ends thereof in a compressed condition in the form of an S-letter configuration;

FIG. 4 illustrates a modification of the mounting construction of the leaf spring shown in FIG. 2. wherein the leaf spring is carried by a pair of restriction members at an intermediate portion thereof;

FIG. 16 illustrates a modification of the keyboard apparatus shown in FIG. 8.

DESCRIPTION OF THE PREFERRED EMBODIMENTS

Figure 5:
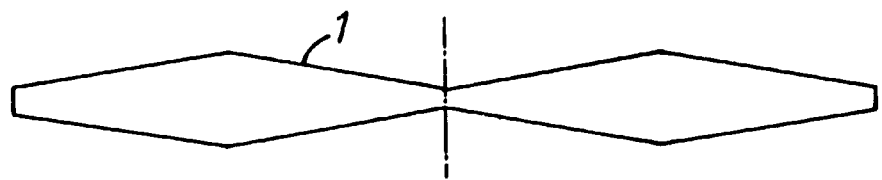
FIG. 5 is a plan view of a modification of the leaf spring shown in FIG. 1.

Illustrated in FIG. 1 is an elongated rectangular leaf spring 1 of L in length, B in width and t in thickness. In FIGS. 2 and 3, there is illustrated a condition where the leaf spring 1 is deformed in an approximately S-letter configuration and engaged with a pair of spaced support members 2 and 3 at opposite ends thereof in a compressed condition in such a manner that three nodes N1, N2, N3 are formed at the opposite ends and an intermediate portion of the leaf spring in a longitudinal direction and that a portion between the nodes N1 and N3 is formed as an upwardly bent antinode 1a while a portion between the nodes N2 and N3 is formed as a downwardly bent antinode 1b. If the leaf spring 1 is flat in a free condition, the node N3 is located at a central position between the nodes N1 and N2 as shown in FIG. 2. If the leaf spring 1 warps downwardly as shown by imaginary lines in FIG. 3, the node N3 is displaced from the central position toward the right-hand node N2. In such a condition as illustrated in FIGS. 2 and 3, the leaf spring 1 acts to effect outward biasing forces P1 and P2 of the same value (P1=P2) acting on the support members 2 and 3 in a longitudinal direction irrespectively of a compressed amount thereof.

The outward biasing forces P1 and P2 acting on the support members 2 and 3 are separately effected by the upwardly bent portion 1a and the downwardly bent portion 1b. In the case that the antinode portion 1a is bent in an opposite direction relative to the warp direction of the leaf spring 1 in its free condition as shown in FIG. 3, the antinode portion 1a is prolonged to offset an increase of the blasing force P1 caused by warp of the leaf spring 1. On the other hand, the antinode portion 1b bent in the same direction as the warp direction of leaf spring 1 in its free condition is shortened to increase the biasing force P2 tending to decrease less than the biasing force P2 in FIG. 2. Thus, the node N3 of leaf spring 1 is displaced to effect the outward biasing forces P1 and P2 as those in the leaf spring shown in FIG. 2 without any influence caused by warp of leaf spring 1.

Since the warp of leaf spring 1 is caused by rolled steel plate used for preparation of the leaf spring, the leaf spring 1 warps only in a downward or upward direction without warping in a complicated form. Accordingly, in the case that the leaf spring 1 is engaged with the support members 2 and 3 at the opposite ends thereof in the form of an S-letter configuration as shown in FIG. 2 or 3, the outward biasing forces P1 and P2 of leaf spring 1 becomes equal to one another even if the leaf spring 1 warps in a free condition.

In addition. the outward biasing forces P1 and P2 of leaf spring 1 each become equal to a biasing force effected by a leaf spring of half length (L/2) deformed in a C-letter configuration in a compressed condition. Thus, the outward biasing forces P1 and P2 of leaf spring 1 are represented by the following equation (1) based on Euler's formula.

$$P1=P2=\pi^2 EBt^3/12(L/2)^2 = \pi^2 EBt^3/3L^2 \qquad (1)$$

Figure 7:
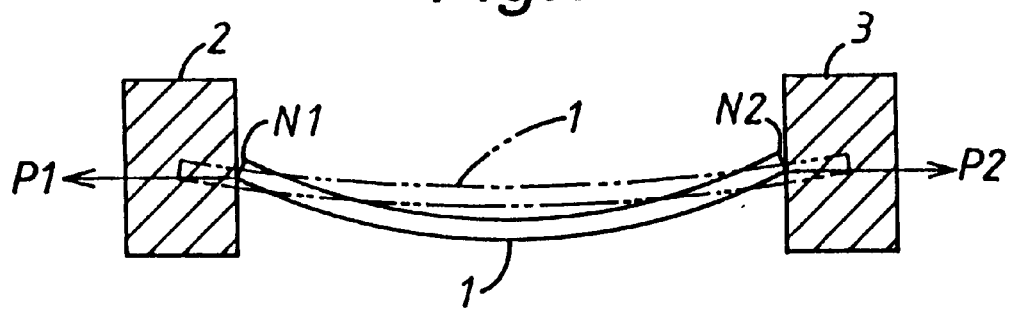
FIG. 7 illustrates a conventional leaf spring engaged with a pair of spaced support members at opposite ends thereof in a compressed condition.

In contrast with the leaf spring 1. the biasing forces P1 and P2 of the conventional leaf sprint shown in FIG. 7 are represented by the following equation (2).

$$P1=P2=\pi^2 EBt^3/12L^2 \qquad (2)$$

From the above equations (1) and (2), it is noted that the thickness t of leaf spring 1 can be determined to be $(1/4)^{1/3}$ (=0.63) times the thickness t of the conventional leaf spring for effecting the same outward biasing forces. This means that the raw material of the leaf spring 1 can be reduced to 63% of the raw material of the conventional leaf spring to decrease the manufacturing cost of leaf spring 1.

Figure 6:
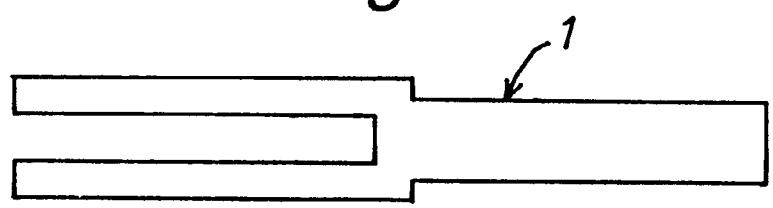
FIG. 6 is a plan view of another modification of the leaf spring shown in FIG. 1.

Illustrated in FIG. 4 is a modification of the mounting construction of leaf spring 1, wherein the leaf spring 1 is carried by a pair of support rods 4a and 4b at its central position to restrict vertical displacement of the leaf spring 1. With such an arrangement of the support rods 4a and 4b, the node N3 is formed at the central position of leaf spring 1 to stabilize the deformation of leaf spring 1. Although in the above embodiments, the leaf spring 1 has been formed in an elongated rectangular shape, the leaf spring 1 may be provided in the form of a pair of rhombuses as shown in FIG. 5 or may be formed at one end thereof with a pair of bifurcated portions as shown in FIG. 6.

Figure 8:
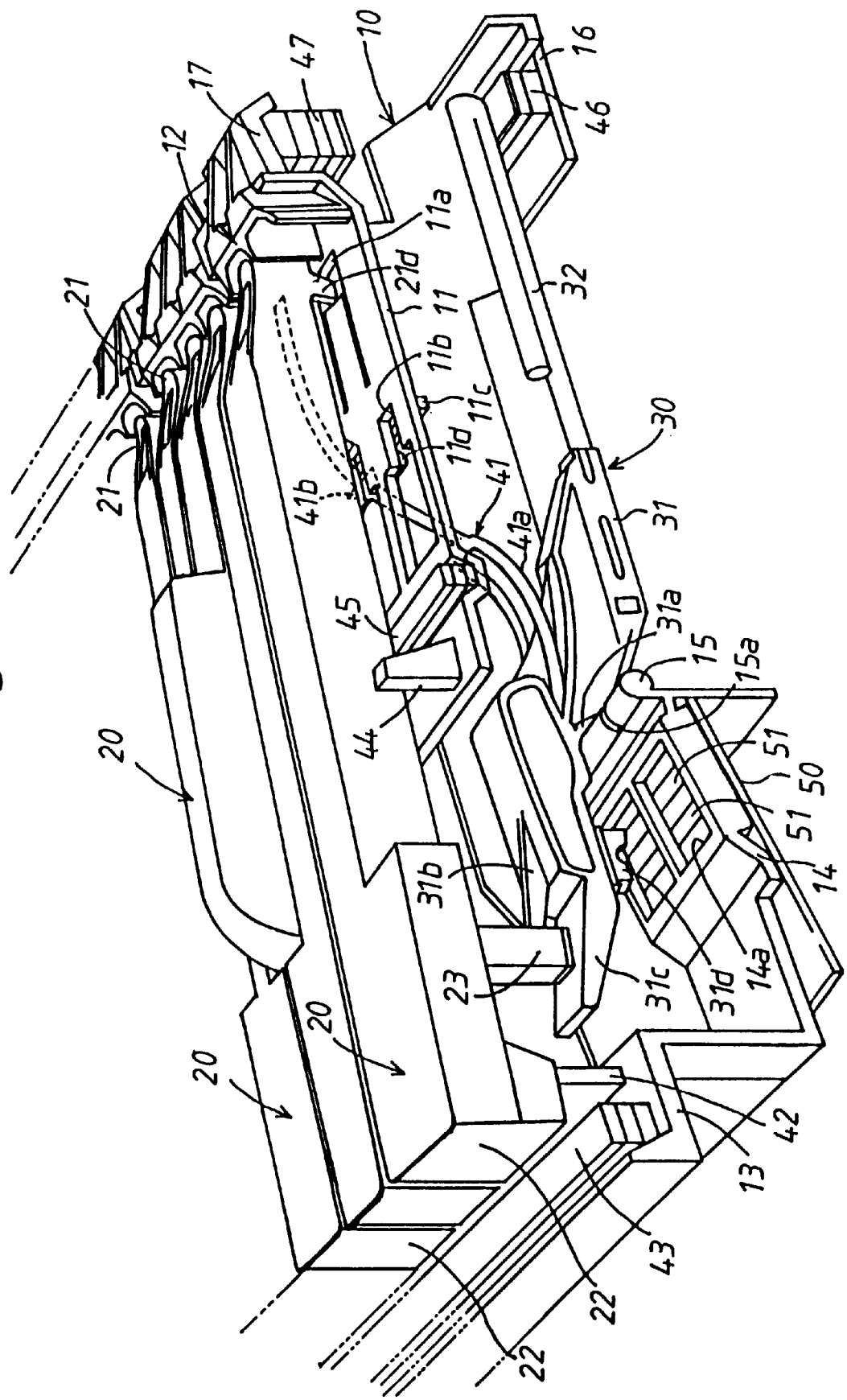
FIG. 8 is a perspective view of a keyboard apparatus each key of which is biased by a mounting construction of a leaf spring in accordance with the present invention.
Figure 10:
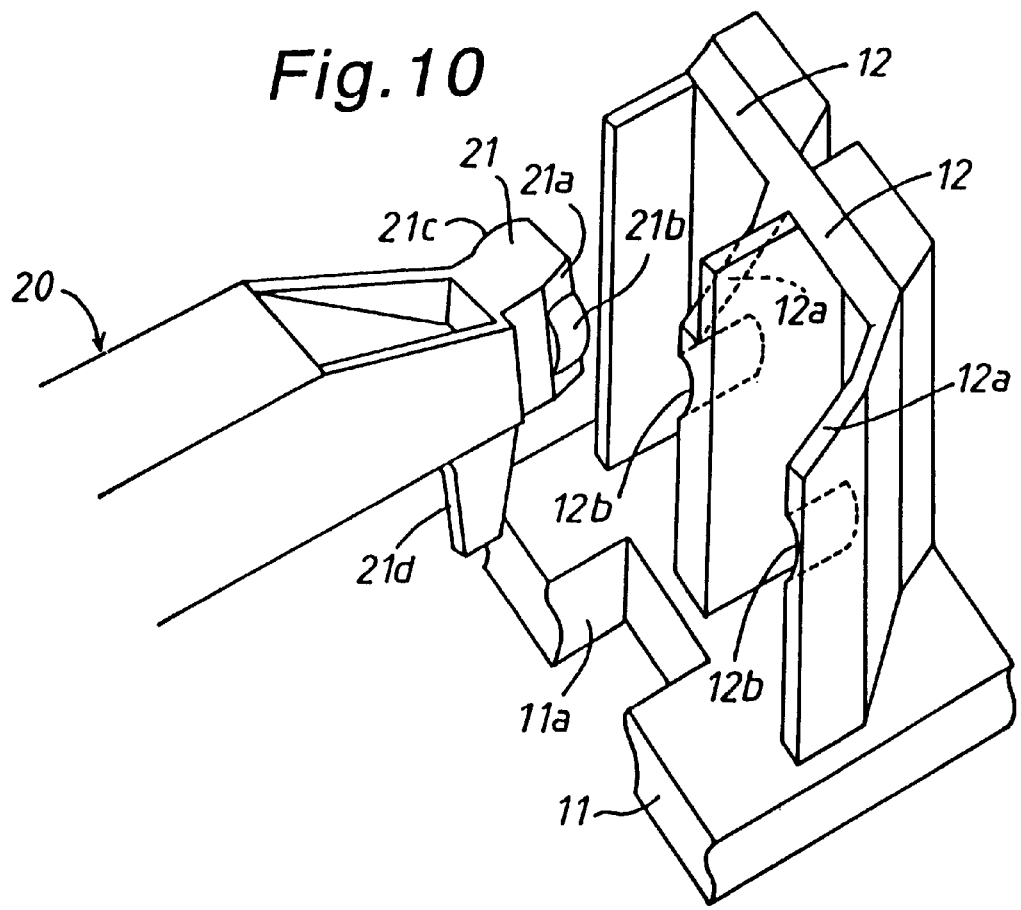
FIG. 10 is an enlarged perspective view illustrating an assembly construction of a proximal end or a key shown in FIG. 8.
Figure 11:
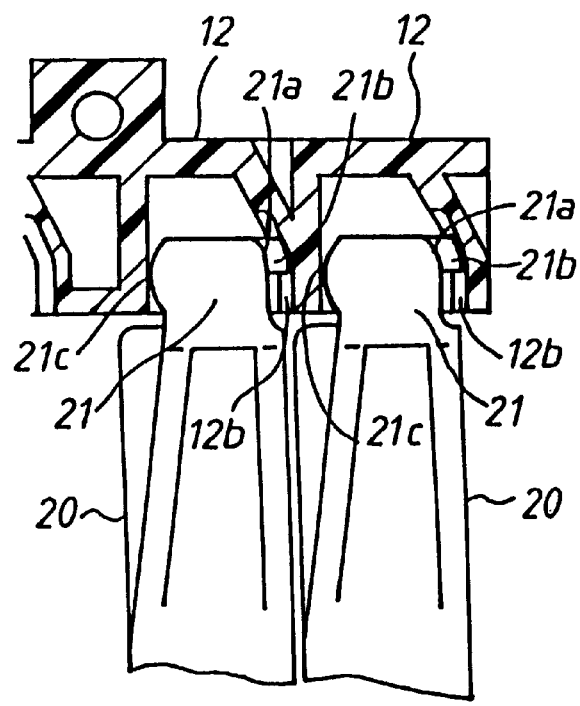
FIG. 11 is an enlarged transverse sectional view of the assembly construction of the proximal end of the key shown in FIG. 10.

Hereinafter, an embodiment of the present invention adapted to a keyboard apparatus will be described in detail with reference to FIGS. 8 and 9. As shown in FIG. 8, the keyboard apparatus has a plurality of keys 20 mounted in parallel on a frame structure 10 of synthetic resin and a plurality of swing levers 30 arranged under the respective keys 20. The keys 20 each are made of synthetic resin and formed in a channel shape in cross-section. The key 20 in the form of a white key is pivoted at its proximal end on the frame structure 10 to be movable in a vertical direction and is loaded rearward by a leaf spring 41. As shown in FIGS. 10 and 11. the proximal end 21 of key 20 is formed at one side thereof with a pair of flat surfaces 21a tapered rearward and a lateral semi-columnar protrusion 21b. The proximal end of key 20 is formed at the other side thereof with a vertical semi-columnar portion 21c. The key 20 is integrally formed at its proximal end portion 21 with a downward projection 21d which is inserted into a rectangular recess 11a in a horizontal support plate 11 integral with the frame structure 10.

The frame structure 10 is formed at its rear end with a plurality of vertical walls 12 each of which is a channel shape in cross-section. The vertical walls 12 each are formed to receive the proximal end 21 of key 20 and formed at one side thereof with a downwardly tapered guide surface 12a and a lateral recess 12b to be coupled with the lateral protrusion 21b of the proximal end 21 of key 20. As shown in FIGS. 8 and 9, the front end 22 of key 20 is guided by a vertical guide member 42 mounted on a front end horizontal portion 13 of frame structure 10. An elongated key stopper 43 of layered felts is secured on the front end horizontal portion 13 of frame structure 10 in a lateral direction of the keyboard to restrict downward movement of the key 20. The key 20 in the form of a black key is guided by a vertical guide member 44 mounted on the horizontal support plate 11. An elongated key stopper 45 of layered felts is secured on the horizontal support plate 11 in the lateral direction of the keyboard to restrict downward movement of the black key 20. The key stoppers 43 and 45 are positioned to be spaced in a slight clearance from the bottom surfaces of keys 20 when the keys 20 are depressed for performance of a music and to restrict downward movement of the keys 20 only when the keys 20 are applied with a heavy load.

Figure 12:
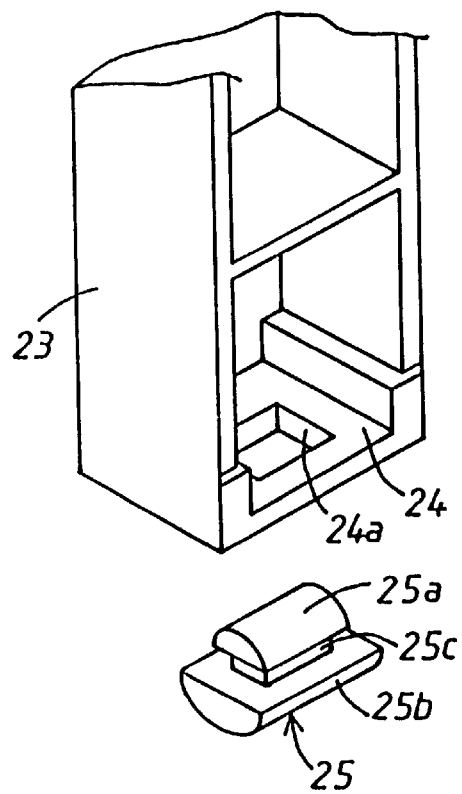
FIG. 12 is an enlarged perspective view of a vertical hammer portion of the key shown in FIG. 8.
Figure 13:
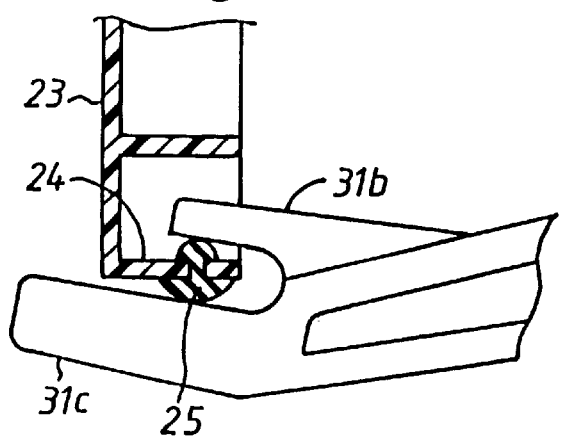
FIG. 13 is an enlarged sectional view of the vertical hammer portion of the key assembled with a swing lever shown in FIG. 8.

At the front end portion of key 20, a vertical hammer portion 23 is integrally formed with the bottom face of key 20. As shown in FIGS. 9, 12 and 13, the vertical hammer portion 23 is in a channel shape opened rearward and is formed with a bottom wall 24. An elastic element 25 made of synthetic rubber is fixedly coupled with a rectangular aperture 24a of bottom wall 24. The elastic element 25 is formed with a pair of spaced semi-collinar portions 25a and 25b which are integrally connected to one another by means of a stem portion 25c. The elastic element 25 is coupled with the aperture 24a at its stem portion 25c in such a manner that the semi-columnar portions 25a and 25b are placed in the lateral direction of the keyboard. The semi-columnar portions 25a and 25b are coated with lubricant, and the stem portion 25c is adhered to the bottom wall 24.

Figure 9:
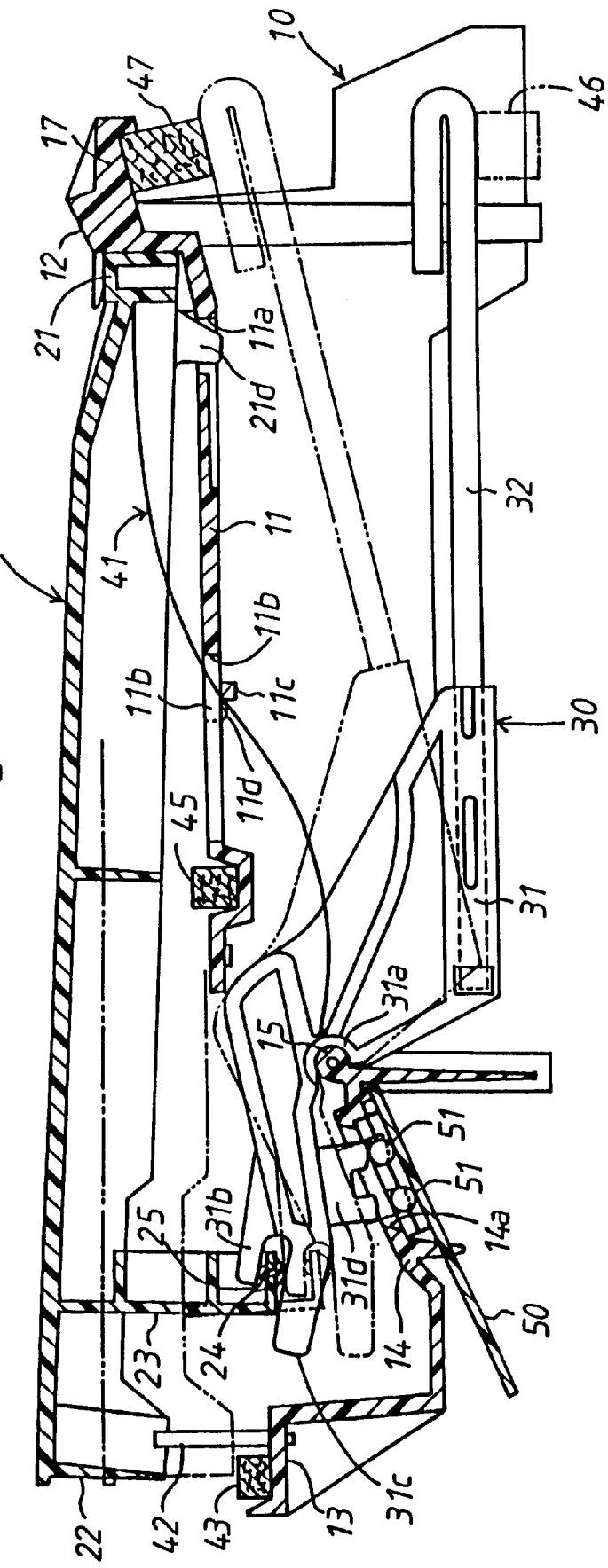
FIG. 9 is a sectional view of the keyboard apparatus shown in FIG. 8.
Figure 14A:
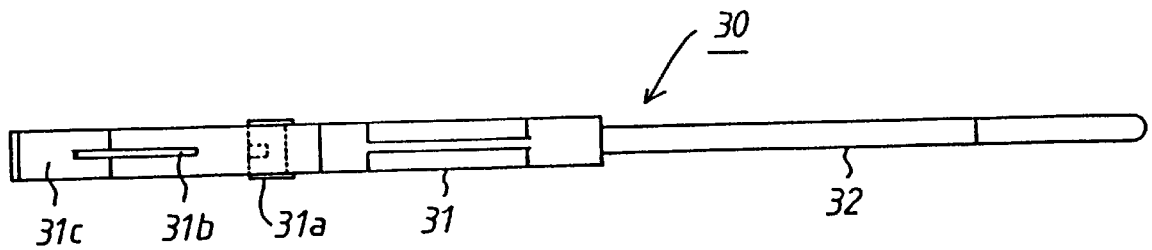
FIG. 14(A) is a plan view of the swing lever shown in FIG. 8.
Figure 14B:
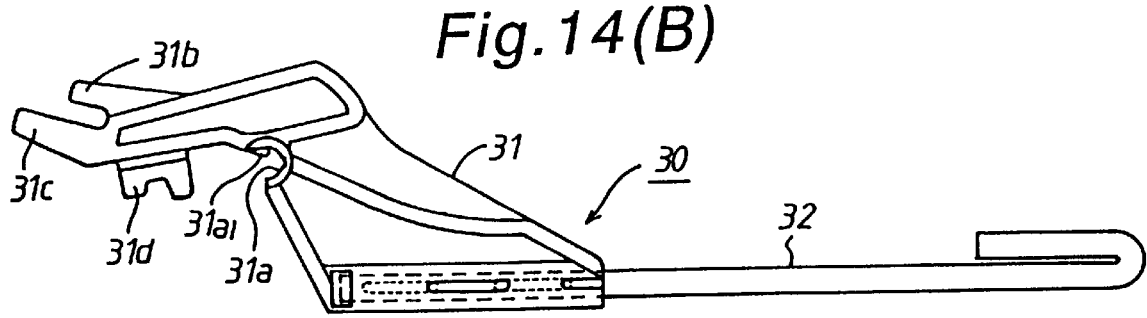
FIG. 14(B) is a side view of the swing lever shown in FIG. 8.

As shown in FIGS. 8, 9 and 14, the swing lever 30 is composed of a body member 31 made of synthetic resin and an elongated metallic weight 32. The body member 31 is in the form of a flat plate which is vertically placed in a fore-and-aft direction under the front end portion of key 20. The body member 31 of swing lever 30 is formed at its bottom central portion with a cylindrical recess 31a the axis line of which is aligned in the lateral direction of the keyboard. The cylindrical recess 31a is opened upwardly forward and coupled with a pivot portion 15 formed on an upper end of an inclined plate 14 extending upwardly rearward from the front bottom portion of frame structure 10. As shown in FIG. 8, the pivot portion 15 is formed with an annular groove 15a which is engaged with a small projection 31a1 formed on an internal wall of cylindrical recess 31a to restrict lateral movement of the body member 31.

Figure 15:
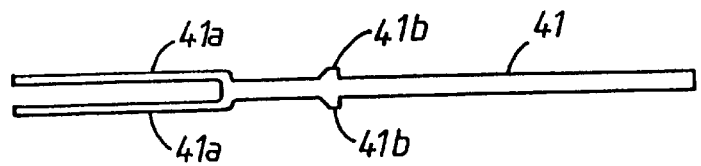
FIG. 15 is a plan view of an elongated leaf spring shown in FIG. 8.

The swing lever 30 is loaded forwardly by means of the elongated leaf spring 41 engaged at its rear end with the proximal end of key 20. As shown in FIG. 15, the leaf spring 41 has a front end portion in the form of a pair of bifurcated parallel legs 41a, 41a and is formed at its central portion with a pair of projections 41b and 41b. The legs 41a, 41a of leaf spring 41 are extended forward at opposite sides of an upper thin portion of body member 31 and engaged at their front ends with an outer peripheral portion of the cylindrical recess 31a. The rear portion of leaf spring 41 is extended upwardly through a slot 11b formed in the horizontal support plate 11 and engaged with an internal wall of the proximal end of key 20. The slot 11b is formed larger in width than the leaf spring 41 and is formed with lower and upper projections 11c and 11d positioned thereacross. Thus, the leaf spring 41 is assembled in a condition deformed in an S-letter configuration by engagement with the proximal end of key 20 and the outer peripheral portion of the cylindrical recess 31a and is carried by the lower and upper projections 11c and 11d at its central portion. In such an arrangement of the leaf spring 41, the lower projection 11c acts to restrict downward movement of the leaf spring 41, while the upper projection 11d acts to restrict upward movement of the leaf spring 41. This is effective to stabilize the deformed condition of leaf spring 41.

The body member 31 of swing lever 30 is formed at the front end thereof with a pair of vertically bifurcated legs 31b and 31c. The upper leg 31b is formed smaller in length than the lower leg 31c. The vertical hammer portion 23 of key 20 is engaged at its bottom wall 24 with the pair of legs 31b and 31c of body member 31 through the elastic element 25 in such a manner as to permit sliding movement of the elastic element 25 relative to the legs 31b and 31c. As shown in FIG. 14, the body member 31 of swing lever 30 is formed at its bottom face with a switch drive portion 31d which is located between the leg 31c and cylindrical recess 31a. As shown in FIG. 99 the switch drive portion 31d is opposed to a pair of rubber contact switches 51 and 51 through an opening 14a formed in the inclined plate 14. The rubber contact switches 51 and 51 are mounted in parallel on a print board 50 which is assembled in parallel with the bottom face of inclined plate 14. The switch drive portion 31d of body member 31 is formed with a pair of projections which are brought into engagement with the rubber contact switches 51 and 51 in a direction perpendicular to the print board 50 when the key 20 is depressed.

The elongated weight 32 is in the form of a rod the front end of which is connected to the body member 31 of swing lever 31 by outsert forming of body member 31. The rear end of rod 32 is folded at an appropriate position to adjust the load of weight 32. As shown in FIG. 8, an elongated stopper 46 of layered felts is mounted on a bottom lateral plate 18 located at the rear end of frame structure 10 to restrict downward movement of the rear end of weight 32 thereby to restrict upward movement or the front end of key 20. On the other hand, an elongated stopper 46 of layered felts is secured to an upper lateral plate 17 located above the rear end of frame structure 10 to restrict upward movement of the rear end of weight 32 thereby to restrict downward movement of the front end of key 20.

During an assembly process of the keyboard apparatus, the swing lever 30 is coupled with the pivot portion 15 of frame structure 10 at its cylindrical recess 31a, Thereafter, the bifurcated leg portions 41a, 41a of leaf spring 41 are placed at the opposite sides of the thin portion 31 of body member 30 and engaged with the outer peripheral portion of cylindrical recess 31a at their front ends. In such a condition, the rear portion of leaf spring 41 is extended upwardly through the slot 11b of horizontal support plate 11 so that the projections 41b, 41b of leaf spring 41 are engaged with the lower projection 11c of horizontal support plate 11 at their rear ends and engaged with the upper projection 11d of horizontal support plate 11 at their upper surfaces. As a result, the front portion of leaf spring 41 is bent downward to bias the swing lever 30 toward the pivot portion 15 thereby to retain the swing lever 30 in position.

Subsequently, the rear portion of leaf spring 41 is engaged at its rear end with the internal wall of the proximal end 21 of key 20 so that the leaf spring 41 is deformed in an S-letter configuration to bias the key 20 rearward. Thereafter, the vertical hammer portion 23 or key 20 is engaged at its bottom wall 24 with the bifurcated legs 31b and 31c of swing lever 30 through the elastic element 25, while the vertical guide member 42 is inserted into the interior of the front end or key 20. In such a condition, the proximal end 21 of key 20 is pushed into the channel of vertical wall 12 during which the lateral protrusion 21b of the proximal end 21 is guided by sliding engagement with the tapered guide surface 12a of vertical wall 12 and placed to correspond with the lateral recess 12b of vertical wall 12. As a result, the proximal end 21 of key 20 is coupled within the channel of vertical wall 12 under the load of leaf spring 41 in a condition where the flat surfaces 21a of the proximal end 21 are slightly spaced from an internal side surface of vertical wall 12 and where the rear end surface of the proximal end 21 is spaced from an internal rear surface of vertical wall 12.

In the keyboard apparatus assembled as described above. the projections 11c and 11d act to restrict vertical displacement of the leaf spring 41 at its central portion. This is effective to provide a node at the central portion of leaf spring 41 thereby to stabilize the deformed condition of leaf spring 41.

In a released condition of the key 20, the weight 32 of swing lever 30 is maintained in engagement with the stopper 46 by its self-weight to place the key 20 and swing lever 30 as shown by solid lines in FIG. 9. When the key 20 is depressed at its front end portion against the load of weight 32, downward movement of the key 20 is restricted by abutment of the weight 32 against the upper stopper 47 as shown by imaginary lines in FIG. 9. When the key 20 is released, the weight 32 acts to return the swing lever 30 to the initial position.

With the foregoing arrangement of the leaf spring in the keyboard apparatus, the key 20 and swing lever 30 are applied with a constant biasing force irrespectively of warp of the leaf spring in a free condition. This is useful to uniform touch feeling of the respective keys 20. Since the swing lever 30 is pivoted at its cylindrical recess 31a on the pivot portion 15 located lower than the proximal end of key 20, the leaf spring 41 acts to bias the key 20 slightly upward. However, as the upward biasing force of leaf spring 41 is small, the leaf spring 41 acts to bias the key 20 mainly rearward. Thus, a reaction force acting on the key 20 in depression is caused by an inertia moment of the swing lever 30. This is effective to enhance touch feeling of the key.

Although in the keyboard apparatus, the leg portions 41a, 41a of leaf spring 41 are engaged at their front ends with the outer peripheral portion of the cylindrical recess 31a, the leg portions 41a, 41a of leaf spring 41 may be selectively engaged at their front ends with one of plural projections 31a2 formed on the outer peripheral portion of the cylindrical recess 31a as shown in FIG. 16. In such an arrangement, the leg portions 41a, 41a of leaf spring 41 can be adjusted in height at their front ends to control the upward biasing force acting on the key 20 for fine adjustment of touch feeling of the key. In a practical embodiment, the projections 31a2 formed on the outer peripheral portion of the cylindrical recess 31a may be replaced with plural recesses.

What is claimed is:

1. An elongated leaf spring assembled within a keyboard apparatus in a condition where said leaf spring is deformed in an S-letter configuration to be engaged with a pair of spaced support members at opposite ends thereof in a compressed condition, wherein said leaf spring is mounted on a frame structure of the keyboard apparatus in such a manner that three nodes are formed at the opposite ends and an intermediate position of the leaf spring in a longitudinal direction to form a pair of antinodes between the opposite ends and an intermediate position of said leaf spring, and wherein said leaf spring is carried by a pair of stationary restriction members on the frame structure at its intermediate position to restrict vertical displacements of said leaf spring so as to form one of the three nodes at the intermediate position of said leaf spring.

2. An elongated leaf spring as recited in claim 1, wherein said leaf spring is formed in a pair of rhombuses to be maintained in engagement with said restriction members at its central portion.

3. An elongated leaf spring as recited in claim 1, wherein said leaf spring is formed at its central portion with a pair of projections maintained in engagement with said restriction members.

4. A mounting construction of an elongated leaf spring in a keyboard apparatus, said leaf spring being deformed in an S-letter configuration and engaged with a pair of spaced support members at opposite ends thereof in a compressed condition to effect outward biasing forces acting on said support members, wherein said leaf spring is mounted on a frame construction of the keyboard apparatus such that three nodes are formed at the opposite ends and an intermediate position of said leaf spring in a longitudinal direction to form a pair of antinodes between the opposite ends and intermediate position of said leaf spring, and wherein said leaf spring is carried by a pair of stationary restriction members on the frame structure at its intermediate position to restrict vertical displacements of said leaf spring to form one of the three nodes at the intermediate position of said leaf spring.

5. A keyboard apparatus comprising:

a frame structure;

a key pivoted on a rear end portion of said frame structure at a proximal end thereof to be movable in a vertical direction;

a swing lever pivoted on a support portion of said frame structure spaced forward from the pivoted position of said key to be movable in a vertical direction, said swing lever being engaged with a front portion of said key to apply a reaction force to said key when said key is depressed, wherein an elongated leaf spring deformed in an S-letter configuration is engaged at opposite ends with the pivoted portion of said swing lever and the proximal end of said key in a compressed condition in such a manner that three nodes are formed at the opposite ends and an intermediate position of said leaf spring in a longitudinal direction to form a pair of antinodes between the opposite ends and intermediate position of said leaf spring.

6. A keyboard apparatus as recited in claim 5, wherein said leaf spring is carried by a pair of restriction portions integrally formed with said frame structure to restrict vertical displacement of said leaf spring to form one of the three nodes at the intermediate position of said leaf spring.

7. A keyboard apparatus as recited in claim 5, wherein said leaf spring has a front end portion formed in a pair of bifurcated legs which are placed at opposite sides of a body portion of said swing lever and engaged at their front ends with the pivoted portion of said swing lever.

8. A keyboard apparatus as recited in claim 5, wherein the pivoted portion of said swing lever is located lower than the pivoted portion or said key and is formed with a plurality of engagement portions different in height to be selectively engaged with the front end of said leaf spring.

9. A keyboard apparatus comprising:

a frame structure;

a key pivoted on said frame structure to be movable in a vertical direction;

a swing lever pivoted on a support portion of said frame structure spaced forward from the pivoted position of said key to be movable in a vertical direction, said swing lever being engaged with a front portion of said key to apply a reaction force to said key when said key is depressed;

wherein an elongated leaf spring deformed in an S-letter configuration is engaged at opposite ends with the pivoted portion of said swing lever and a rear portion of said key in a compressed condition in such a manner that three nodes are formed at the opposite ends and an intermediate position of said leaf spring in a longitudinal direction to form a pair of antinodes between the opposite ends and an intermediate position of said leaf spring.

* * * * *